United States Patent [19]

Yamamoto et al.

[11] Patent Number: 5,426,528
[45] Date of Patent: Jun. 20, 1995

[54] CORRECTION DEVICE OF LIGHT BEAM DEVIATION OF PRIMARY SCANNING DIRECTION THEREOF IN IMAGE FORMING APPARATUS

[75] Inventors: Hiroyuki Yamamoto; Kouichi Takaki, both of Hachioji, Japan

[73] Assignee: Konica Corporation, Tokyo, Japan

[21] Appl. No.: 213,956

[22] Filed: Mar. 16, 1994

[30] Foreign Application Priority Data

Apr. 15, 1993 [JP] Japan .................................. 5-088829

[51] Int. Cl.$^6$ ............................................ G02B 26/08
[52] U.S. Cl. .................................... 359/204; 250/235; 347/19
[58] Field of Search ......................... 359/204, 216–220; 250/578.1, 235, 236; 346/108; 358/474, 493, 494, 302

[56] References Cited

U.S. PATENT DOCUMENTS 4,933,549  6/1990  Fujioka et al. .
4,950,889  8/1990  Budd et al. .
4,978,849  12/1990  Goddard et al. .
5,103,091  4/1992  Hirose et al. .......................... 346/108

FOREIGN PATENT DOCUMENTS

0412036  2/1991  European Pat. Off. .
2-188713  7/1990  Japan .

*Primary Examiner*—Loha Ben
*Assistant Examiner*—James Phan
*Attorney, Agent, or Firm*—Frishauf, Holtz, Goodman & Woodward

[57] ABSTRACT

A correction device for correcting the deviation of light beams of a primary scanning direction used for an image forming apparatus in which a plurality of light beams are simultaneously scanned on a recording medium in the primary scanning direction so that a plurality of lines are simultaneously recorded. A plurality of beam detectors, the number of which corresponds to the number of beams of light, are disposed in a scanning region in parallel with the primary scanning direction. Only one light beam is incident upon each beam detector, and a difference of detection time between the plurality of beam detectors is detected by a same beam detection interval detector. A different beam detection interval detector detects a time difference between detection of different light beams are detected. Based on the time differences detected by the same beam detection interval detector and by the different beam detection interval detector, a deviation time calculator calculates the deviation of a plurality of light beams of the primary scanning direction. Based on the calculation result of the deviation time calculator, a deviation corrector controls the phase of a printing clock for the image formation conducted by the plurality of light beams and also controls a timed relation of the start of image formation.

5 Claims, 7 Drawing Sheets

CORRECTION DEVICE OF LIGHT BEAM DEVIATION OF PRIMARY SCANNING DIRECTION THEREOF IN IMAGE FORMING APPARATUS

BACKGROUND OF THE INVENTION

The present invention relates to a correction device for correcting the deviation of laser beams of the primary scanning direction used for an image forming apparatus. More particularly, the present invention relates to a correction device for correcting the deviation of laser beams of the primary scanning direction used for an image forming apparatus in which a plurality of beams of light simultaneously conduct scanning so that a plurality of lines can be simultaneously recorded, the correction device characterized in that: the deviation of beams of the primary scanning direction is detected; and an image forming position of each beam of light is corrected by a simple construction in accordance with the result of detection.

In an image forming apparatus, a laser beam modulated in accordance with an image signal is reflected on a rotational polygonal mirror so that the laser beam scans on a recording medium. In order to increase the recording speed in the above image forming apparatus, a plurality of laser beams are used and a plurality of lines are simultaneously recorded. The above construction is well known.

However, in the case where a plurality of laser beams simultaneously conduct scanning, the scanning position of the plurality of laser beams are deviated in the primary scanning direction. Accordingly, it is impossible to conduct image formation accurately and stably.

In order to solve the above problems, the following technique is disclosed in Japanese Patent Publication Open to Public Inspection No. 188713/1990:

Positions of a plurality of laser beams of the primary scanning direction is intentionally deviated beforehand, and a positional relation of the scanning position of each laser beam is investigated to be made clear. Then, a synchronization signal corresponding to each of the laser beams is generated, and recording operation of each laser beam is controlled in accordance with the corresponding synchronization signal.

However, when the positional relation between the scanning positions of laser beams has collapsed, it is difficult to obtain an accurate synchronization signal corresponding to each laser beam. Therefore, it is necessary to improve the mechanism by which a semiconductor laser is mounted, and further it is necessary to make the mount mechanism of heat resistant material so that the positional relation of the scanning position of a plurality of laser beams can be maintained. For this reason, the cost of the apparatus is increased.

SUMMARY OF THE INVENTION

It is an object of the present invention to provide a correction device of laser beam deviation of the primary scanning direction used in an image forming apparatus in which a plurality of light beams simultaneously conduct the scanning operation so as to record a plurality of lines, wherein the deviation of the plurality of light beams of the primary scanning direction is detected, and the image forming position of each light beam is corrected by a simple structure in accordance with the result of the detection.

According to the present invention, in the correction device for correcting the deviation of light beams of the primary scanning direction used for an image forming apparatus, a plurality of beams of light simultaneously conduct scanning on a recording medium in the primary scanning direction so that a plurality of lines are simultaneously recorded. The construction of the correction device for correcting the deviation of light beams of the primary scanning direction will be described as follows.

A plurality of beam detecting means, the number of which corresponds to the number of beams of light, are disposed in a scanning region in series in the primary scanning direction.

Only one beam of light is incident upon each beam detecting means, and a difference of detection time between the plurality of beam detecting means is detected by the same beam detection interval detecting means.

On the other hand, a beam detection control means operates as follows. By the action of the beam detection control means, one different beam of light is selectively incident upon each beam detecting means. Under the condition controlled by the beam detection control means, a different beam detection interval detecting means detects a time difference between the beam detecting means by which different beams of light are detected.

A deviation time calculation means operates as follows. In accordance with the time difference detected by the same beam detection interval detecting means and also the time difference detected by the different beam detection interval detecting means, the deviation time calculation means calculates the deviation time of a plurality of beams of light of the primary scanning direction.

In accordance with the time calculated by the deviation time calculation means, a deviation correction means controls the phase of printing clock for the image formation conducted by the plurality of beams of light and also controls the timed relation of the start of image formation.

In this case, the time in the same beam detection interval detecting means, the different beam detection interval detecting means and the deviation time calculation means may be found in the form of a count value of the printing clock and also in the form of a phase difference of the printing clock in accordance with a plurality of printing clocks of different phases.

Further, the deviation correction means operates as follows. In accordance with a phase difference of printing clock which is the deviation time calculated by the deviation time calculation means, the deviation correction means may select a printing clock corresponding to each beam of light from the plurality of printing clocks. Also, in accordance with a count value of the printing clock which is the deviation time calculated by the deviation time calculation means, the deviation correction means may control a timed relation of the start of image formation conducted by each beam of light.

In accordance with the result of calculation conducted by the deviation time calculation means, the different beam detection control means judges a head beam of light conducting the scanning operation in the primary scanning direction. In order to make at least the head beam of light to be incident upon the beam detecting means on this side in the primary scanning direction, a relation between each beam detecting means and the plurality of beams of light is renewed, and a detection signal of the beam detecting means on this side in the primary scanning direction is outputted as an index signal for controlling a timed relation of the start of image formation.

In accordance with the result of calculation conducted by the deviation time calculation means, a head beam of light conducting the scanning operation in the primary scanning direction is judged, and in the different beam detection control means, a detection signal of the light beam detecting means upon which the head light beam is incident, may be outputted as an index signal of the image formation start timing control.

In the case where scanning is conducted only by one beam of light and the same beam of light is made to be incident upon each beam detecting means, detection signals of the beam detecting means are outputted at a time difference corresponding to the interval of the beam detecting means.

On the other hand, in the case where different beams of light are selectively made to be incident upon the beam detecting means, when there is no deviation of the primary scanning direction among a plurality of beams of light, the detection signals of the beam detecting means are outputted at a time difference corresponding to the intervals of the beam detecting means in the same manner as that of a case in which the same beam of light is incident. However, when there is a deviation of the primary scanning direction among a plurality of beams of light, the output intervals of the detection signals are changed by the time corresponding to the deviation.

Accordingly, when the intervals of the detection signals outputted from the beam detecting means are detected in the case where different beams of light are selectively incident upon the beam detecting means, the deviation of the primary scanning direction between the plurality of beams of light can be found as the time at a predetermined primary scanning speed when a deviation is calculated between the output time difference of the detection signal and the output time difference detected when the same beam of light is incident.

In accordance with the deviation of the primary scanning direction found in the aforementioned manner, the phase of the printing clock for image formation and the timed relation of the start of image formation are controlled. In this way, recording can be accurately conducted by each beam of light while the beams are aligned in the primary scanning direction.

That is, deviation of a plurality of beams of the primary scanning direction is compensated in the following manner. The timed relation of the start of image formation is made to deviate for each beam of light, and the phase of the printing clock is set for each beam of light.

In this case, the detection signal of the beam detecting means is measured as the count value of the printing clock and as the phase difference of the printing clock, using a plurality of printing clocks of different phases, and then the results of measurement are compared with respect to each count value and phase difference. In this way, the deviation time is found as the count value of the printing clock and as the phase difference of the printing clock. Therefore, the phase of the printing clock and the timed relation of the start of image formation can be preferably controlled.

In the case where the deviation time is found by the count value of the printing clock and the phase difference, the printing clock corresponding to each beam of light is selected in accordance with the phase difference of the printing clock, which has been found as deviation time, and the timed relation of the start of image formation of each beam of light is controlled in accordance with the count value of the printing clock, which has been found as deviation time. When the above construction is employed, deviation in the period of the printing clock can be corrected by shifting the phase of the printing clock, and also deviation of an integral multiple of the period of the printing clock can be corrected by the timed relation of the start of image formation.

In this case, it is preferable that the order of a plurality of beams of light in the primary direction is judged in accordance with the result of calculation of deviation time. Also, it is preferable that an index signal of the timed relation control of the start of image formation is synchronized with the detection time of the beam of light which is the head in the scanning operation of the primary scanning.

Therefore, a relation between the beam of light and the beam detecting means is changed so that the beam of light which is the head in the scanning operation is made to be selectively incident upon the beam detecting means on this side in the primary scanning direction in accordance with the result of judgment of the scanning order. In this way, the detection signal of the beam detecting means disposed on this side in the primary scanning direction is used as an index signal.

Alternatively, the detection signal of the beam detecting means upon which the head light beam is incident may be used as an index signal.

DETAILED DESCRIPTION OF THE PREFERRED EMBODIMENT

An example of the present invention will be explained as follows.

Figure 1:
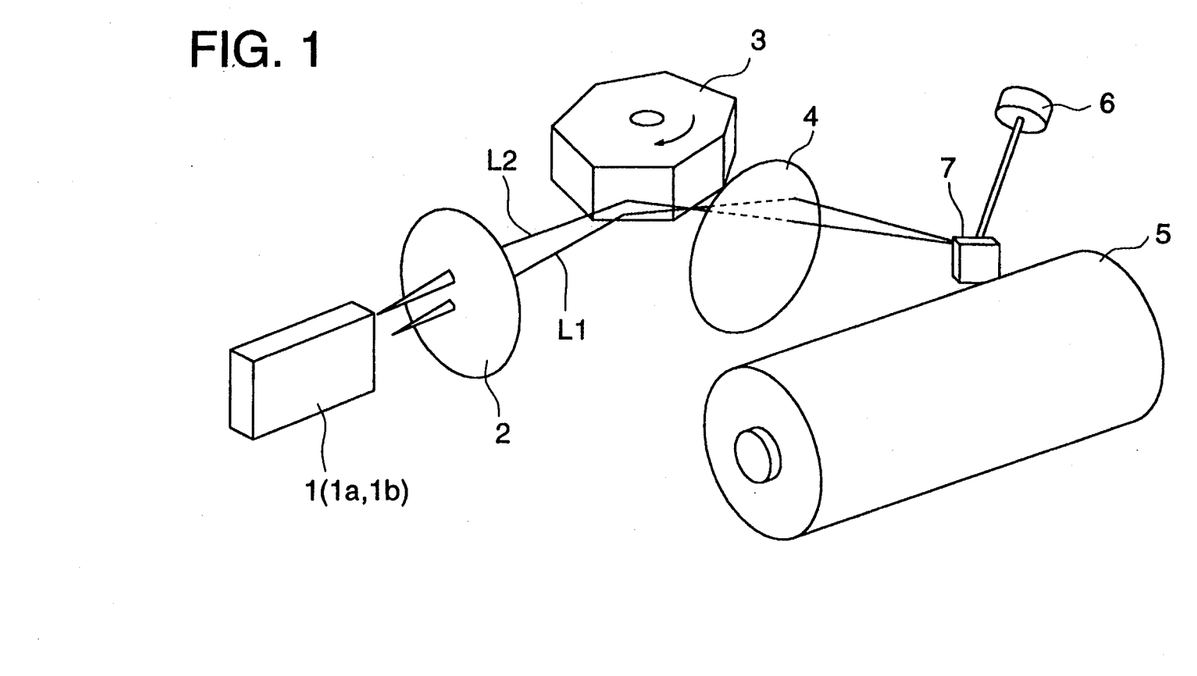
FIG. 1 is a perspective view showing an example of the image exposure system of the present invention.

FIG. 1 is a view showing an example of the image exposure system of a laser printer to which the present invention is applied. In the laser printer of this example, two laser beams L1 and L2 are modulated in accordance with image data. Then, the two laser beams L1 and L2 conduct scanning in parallel with the primary scanning direction, so that two lines can be simultaneously recorded.

In FIG. 1, the light source unit 1 includes two semiconductor lasers 1a, 1b which are in alignment. Two beams of divergent light emitted from the light source unit 1 are made to be two parallel beams L1 and L2 by the action of the condenser lens 2.

The two laser beams L1, L2 irradiate the polygonal mirror 3. After the two laser beams L1, L2 have been reflected on the polygonal mirror 3, they pass through the fθ lens 4 and scan the surface of the photoreceptor drum (recording medium) 5.

The photoreceptor drum 5 is rotated synchronously with the primary scanning conducted by the laser beams L1 and L2. Due to the rotation of the photoreceptor drum 5, the laser beams L1 and L2 are relatively moved in the subsidiary scanning direction with respect to the photoreceptor drum 5, so that two-dimensional image recording can be performed.

As described above, two lines of image exposure are simultaneously conducted in accordance with image data, and an electrostatic latent image is formed on the surface of the photoreceptor drum (recording medium) 5. Electrically charged toner particles, the polarity of which is reverse to that of the electrostatic latent image, are deposited on the electrostatic latent image so that the latent image is developed. After that, the developed toner image is transferred onto a recording sheet in such a manner that the recording sheet is put on the toner image and an electrical charge of the reverse polarity is given to the recording sheet by a corona charger disposed on the reverse side of the recording sheet.

Starting points of scanning operations conducted by the laser beams L1 and L2 reflected on the polygonal mirror 3, are detected by the index sensor (beam detecting means) 6 disposed at a fore end side of the scanning region.

As shown in FIG. 1, the reflecting mirror 7 guide the laser beams L1 and L2 to the index sensor 6 when the laser beams L1 and L2 are irradiated on the end of the scanning line.

Figure 2:
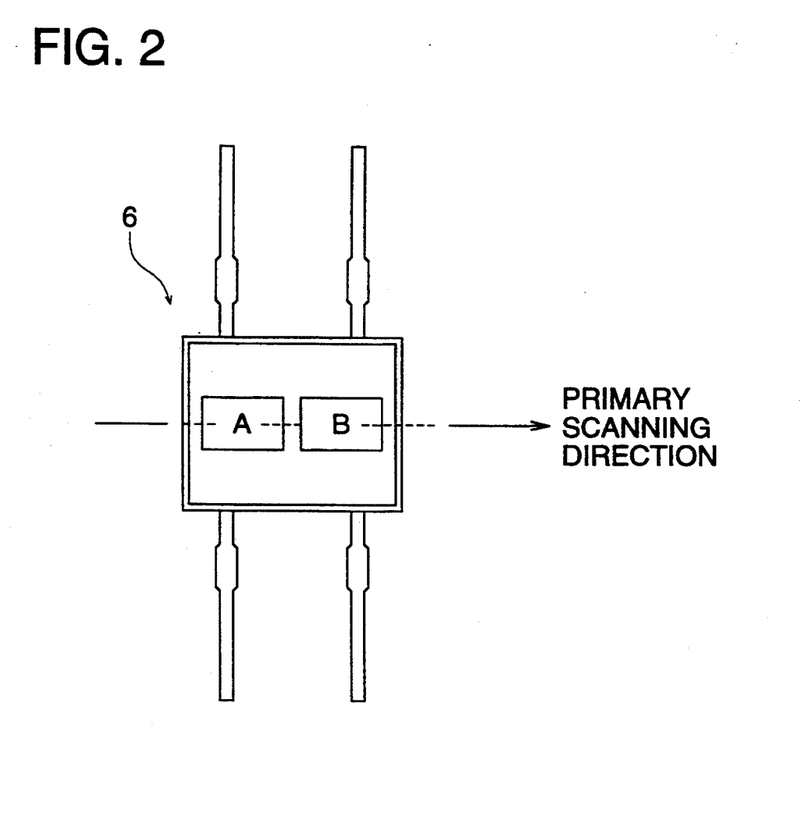
FIG. 2 is a schematic illustration showing the details of the index sensor.

As illustrated in FIG. 2, the index sensor 6 includes two light receiving sections A and B. Each of the light receiving sections A and B is a sensor to output a detection signal of the laser beam. The light receiving sections A and B are disposed in the primary scanning directions of the laser beams L1 and L2, so that the two laser beams L1 and L2 are simultaneously incident upon the light receiving sections A and B. In the following description, the two light receiving sections A and B of the index sensor 6 are respectively referred to as sensors A and B, that is, the following explanation will be given under the condition that the index sensor 6 includes the two beam detecting means corresponding to the number of beams.

In this connection, in the case of a laser printer by which two lines are simultaneously recorded by two laser beams L1 and L2 as described above, image formation can not be accurately carried out when the scanning positions of the laser beams L1 and L2 are shifted to the primary scanning direction. In order to solve the above problems, the laser printer of the present invention has a function of correcting the deviation of laser beams of the primary scanning direction in such a manner that the deviation in the primary scanning direction is detected and the writing positions of the laser beams L1 and L2 are controlled in accordance with the detected deviation.

According to the flow chart shown in FIG. 3, the fundamental operation for detecting and correcting beam deviation will be explained below. Construction of the hardware conducting the operation shown in FIG. 3 will be described later.

First, when the power source is turned on, or immediately before the formation of an image, only one laser beam L1 is turned on, and scanning operation is conducted in the same manner as that of normal image recording. Therefore, the laser beam L1 is incident upon the sensors A and B (two beam detecting means) of the index sensor 6. (S1)

At this time, a period of time TΦ is measured. In this case, TΦ is defined as a period of time which has passed from when the laser L1 is detected by the sensor A on this side of the scanning direction (that is, a rise of the detection signal of the sensor A), to when the laser beam L1 is detected by the sensor B on the far side of the scanning direction (that is, a rise of the detection signal of the sensor B). (S2 shown in FIG. 4)

Figure 4:
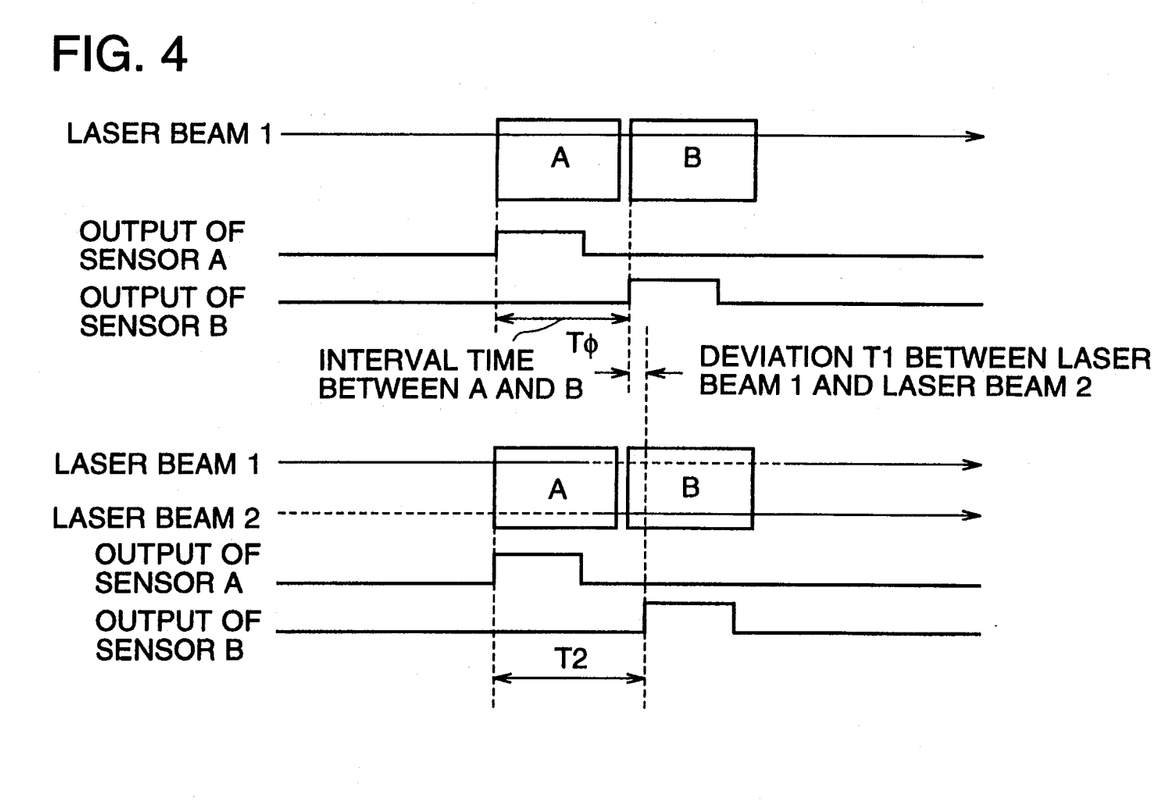
FIG. 4 is a time chart showing the characteristics of detection of deviation time.

The period of time TΦ corresponds to an interval between the sensors A and B under the condition of a predetermined scanning speed. When only the laser beam L2 is turned on instead of the laser beam L1, the same interval time can be measured.

The functions of S1 and S2 described above correspond to the same beam detection interval detecting means of this example.

Next, the two semiconductor lasers 1a, 1b are controlled on the fore end side of primary scanning so that only the laser beam L1 is incident upon the sensor A and only the laser beam L2 is incident upon the sensor B (S3). The function of this S3 corresponds to the different beam detection control means of this example. Even in the normal image formation, the laser beams are selectively incident upon the sensors A and B as described above.

Specifically, the operation is carried out as follows:
At the start of scanning, first, only the laser beam L1 is turned on, and scanning is conducted by the laser beam L1. When the laser beam L1 is detected by the sensor A, it is immediately turned off. Instead of the laser beam L1, the laser beam L2 is turned on and scanning is conducted by the laser beam L2. Then, the laser beam L2 is detected by the sensor B. After the laser beam L2 has been detected by the sensor B, both laser beams L1 and L2 are maintained in a condition in which they are ready for being turned on. In this way. Both laser beams L1 and L2 are prepared for image recording (shown in FIG. 4).

In the above construction in which the laser beam L1 is immediately turned off when the laser beam L1 is detected by the sensor A and the laser beam L2 is turned on instead of the laser beam L1, a detection signal of the laser beam L2 is outputted from the sensor A when a scanning point of the laser beam L2 is set on the sensor A. Therefore, after the laser beam L1 has been detected by the sensor A, the output of the sensor A is preferably stopped, that is, the output of the sensor A is preferably subjected to masking.

As described above, the sensor A detects the laser beam L1, and the sensor B detects the laser beam L2, and the detection interval T2 between the sensors A and B is measured (S4). The function of this S4 corresponds to the different beam detection interval detecting means of this example.

In the case where there is no deviation of the primary scanning direction between the laser beams L1 and L2, the aforementioned time TΦ and T2 are the same, and a difference T1 (=T2−TΦ) corresponds to the deviation in the scanning direction between the laser beams L1 and L2. Therefore, subtraction is performed so as to find the deviation T1 between the time TΦ and T2 (S5). The function of this S5 corresponds to the deviation time calculation means of this example.

When the deviation T1 is a positive value, it represents a condition in which scanning is performed while the laser beam L1 is taking the lead. On the contrary, when the deviation T1 is a negative value, it represents a condition in which scanning is performed while the laser beam L2 is taking the lead.

Figure 5:
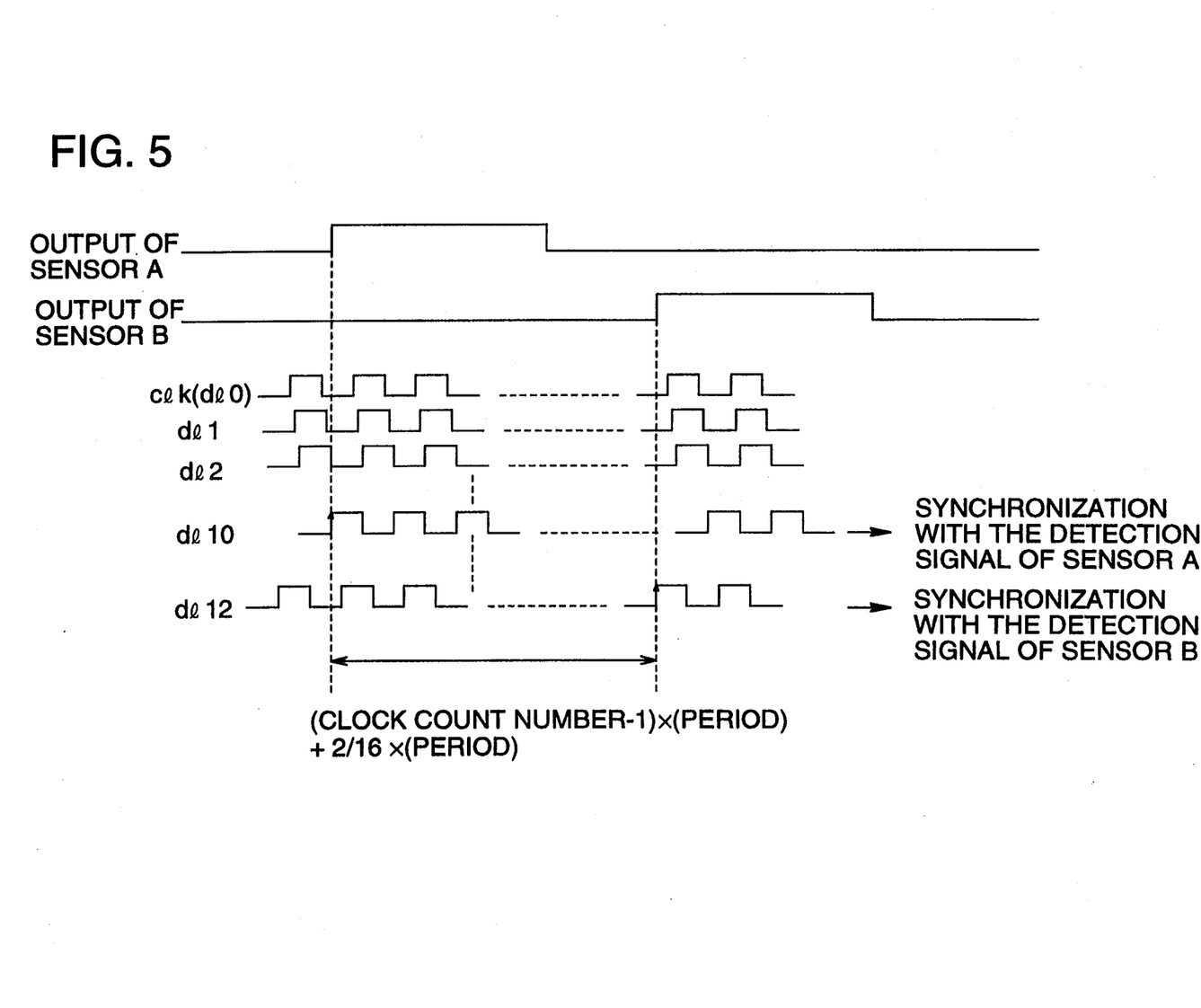
FIG. 5 is a time chart showing the method for measuring detection intervals.
Figure 6:
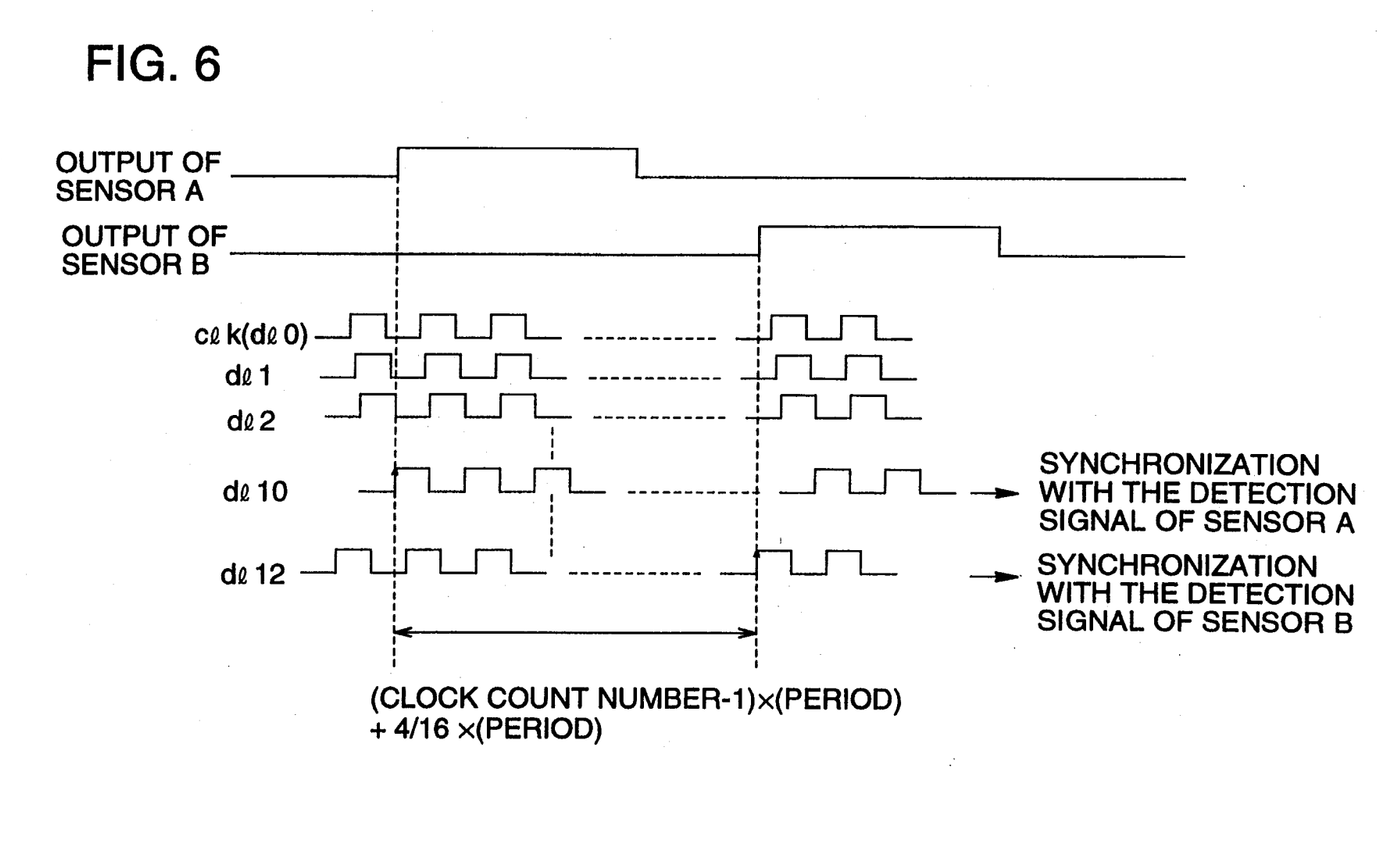
FIG. 6 is a time chart showing the method for measuring detection intervals.

In this case, the time TΦ and T2 are measured in the manner illustrated in FIGS. 5 and 6.

In FIG. 5, dl0 is a reference clock clk (reference printing clock), and 15 types of delay clocks (printing clocks) dl1 to dl15 obtained when the reference clock clk is successively delayed by 1/16 period are generated by a digital delay line. In FIG. 5, only clocks dl0, dl1, dl2, dl10, and dl12 are shown, and other delay clocks are omitted in the drawing.

For example, when a clock synchronizing with the rise of the detection signal of the sensor A (that is, a clock rising first immediately after the rise of the detection signal) is clock dl10, the rise of the synchronization is made to be the first count, and then the rise of this clock dl10 is successively counted.

When a detection signal rises during the counting operation and also when a clock synchronizing with the rise of the detection signal is dl12, an output time difference between the detection signals of the sensors A and B can be found in the following manner:

A value obtained when 1 is subtracted from the counted number of the rises of the clock dl10 (the counted number includes the rise of clock dl10 synchronizing with the detection signal of the sensor A), is multiplied by the clock period. The obtained time is added by the phase difference (2/16 period) between the clocks dl10 and dl12. The value obtained through this addition is the output time difference between the detection signals of the sensors A and B.

In the same manner, in the case shown in FIG. 6, an output time difference between the detection signals of the sensors A and B can be found in the following manner:

A value obtained when 1 is subtracted from the counted number of the rises of the clock dl10 (the counted number includes the rise of clock dl10 synchronizing with the detection signal of the sensor A), is multiplied by the clock period. The obtained time is added by the phase difference (4/16 period) between the clocks dl10 and dl14. The value obtained through this addition is the output time difference between the detection signals of the sensors A and B.

As described above, in this example, the detection interval of the sensors A and B is measured in the form of the counted value of the printing clock and the phase difference of the printing clock while the minimum unit is 1/16 of the printing clock period.

For example, when only the laser beam L1 is incident upon each of the sensors A and B, a synchronizing relation is provided as illustrated in FIG. 5. On the assumption that the counted number of the clock is 11, and when the laser beams L1 and L2 are selectively incident upon the sensors a and b, a synchronizing relation is provided as illustrated in FIG. 6, and it is assumed that the counted number of the clock is 13.

In this case, the time measured in FIG. 5 is $(10 + 2/16) \times$ (period), and the time measured in FIG. 6 is $(12 + 4/16) \times$ (period). Accordingly, when the count value and phase difference of the clock are respectively compared, the deviation time T1 can be found as 2 counts of the count value of the clock (2 periods of the printing clock) and also as 2/16 period of the phase difference of the clock (2 steps of delay).

In this connection, the phase difference corresponding to the deviation in a period of one clock can be expressed by the number of delay clock (the number of steps of delay). For example, in the case where there is no deviation in one period, the number of delay clock is designated as 0, and in the case where there is a deviation of 2/16 period, the number of delay clock is designated as 2.

As described above, the deviation time T1 of the two laser beams L1, L2 in the primary scanning direction is found by the deviation time expressed as an integral multiple of the printing clock period, and also by the phase difference (0/16 to 15/16 × period) which is a deviation in one period of the printing clock. Then, in accordance with the detection of the deviation time, the phase of the printing clock for image formation conducted by laser beams L1, L2, and the time to start the image formation are controlled. Due to the foregoing, image formation can be accurately conducted even when the beam of the primary scanning direction is deviated. In this connection, the phase of the printing clock and the time to start image formation are controlled in a section shown by S6 in FIG. 3. The function of this S6 corresponds to the deviation correction means.

Specifically, the deviation in one period of the printing clock shown by the phase difference of the printing clock is given to the synchronization circuit. Printing clock DCLK1 corresponding to the laser beam L1 and printing clock DCLK2 corresponding to the laser beam L2 are selectively outputted from the printing clocks dl0 to dl15 so that the phases of the printing clocks can have a difference corresponding to the aforementioned deviation.

In the case where the laser beam L1 takes the lead and conducts scanning, the beam L1 is selectively incident upon the sensor A, and the detection signal of the sensor A is outputted as an index signal "index". A delay clock synchronizing with the index signal "index" is selected as the printing clock DCLK1 for the laser beam L1. A printing clock having a phase difference corresponding to the deviation with respect to the printing clock for the laser beam L1, is made to be the printing clock DCLK2 for the laser beam L2.

Consequently, when the deviation of the printing clock DCLK1 for the laser beam L1 synchronizing with the index signal "index", is 2/16 period, the printing clock DCLK2 for the laser beam L2 may output the delay clock dl12. By the aforementioned phase difference of the printing clock, the deviation in one period of the printing clock can be corrected.

On the other hand, the deviation found as the count value of the printing clock is given to the HV generating section. In the HV generating section, an effective image region (the time for starting image formation) controlled in accordance with the count of the printing clock is controlled for for each of the laser beams L1 and L2 in accordance with the deviation of the primary scanning direction. Due to the foregoing, the beam deviation expressed by an internal multiple of the printing clock period can be corrected.

For example, in the case where a writing position of the laser beam L1 taking the lead is determined to be a point of time at which the count number of the printing clock DCLK1 from the index signal "index" becomes N, a writing position of the laser beam L2 which conducts scanning behind the laser beam L1, is determined to be a point of time at which the count number of the printing clock DCLK2 from the index signal "index" becomes a count value corresponding to N+(deviation). Due to the foregoing, the deviation of an integral multiple of the period of the printing clock DCLK can be compensated.

The deviation in one period of the printing clock DCLK, which can not be controlled to the writing position by counting the printing clock DCLK, is corrected by the phase difference between the printing clocks DCLK1 and DCLK2 as described above. As a result, the deviation of the primary scanning direction found as the count number and phase difference of the printing clock can be corrected, and image recording can be accurately conducted by the laser beams L1 and L2.

Next, with reference to FIG. 7, a specific example of the circuit diagram will be explained, in which the operation for detecting and correcting the deviation can be performed in the manner described above.

Figure 7:
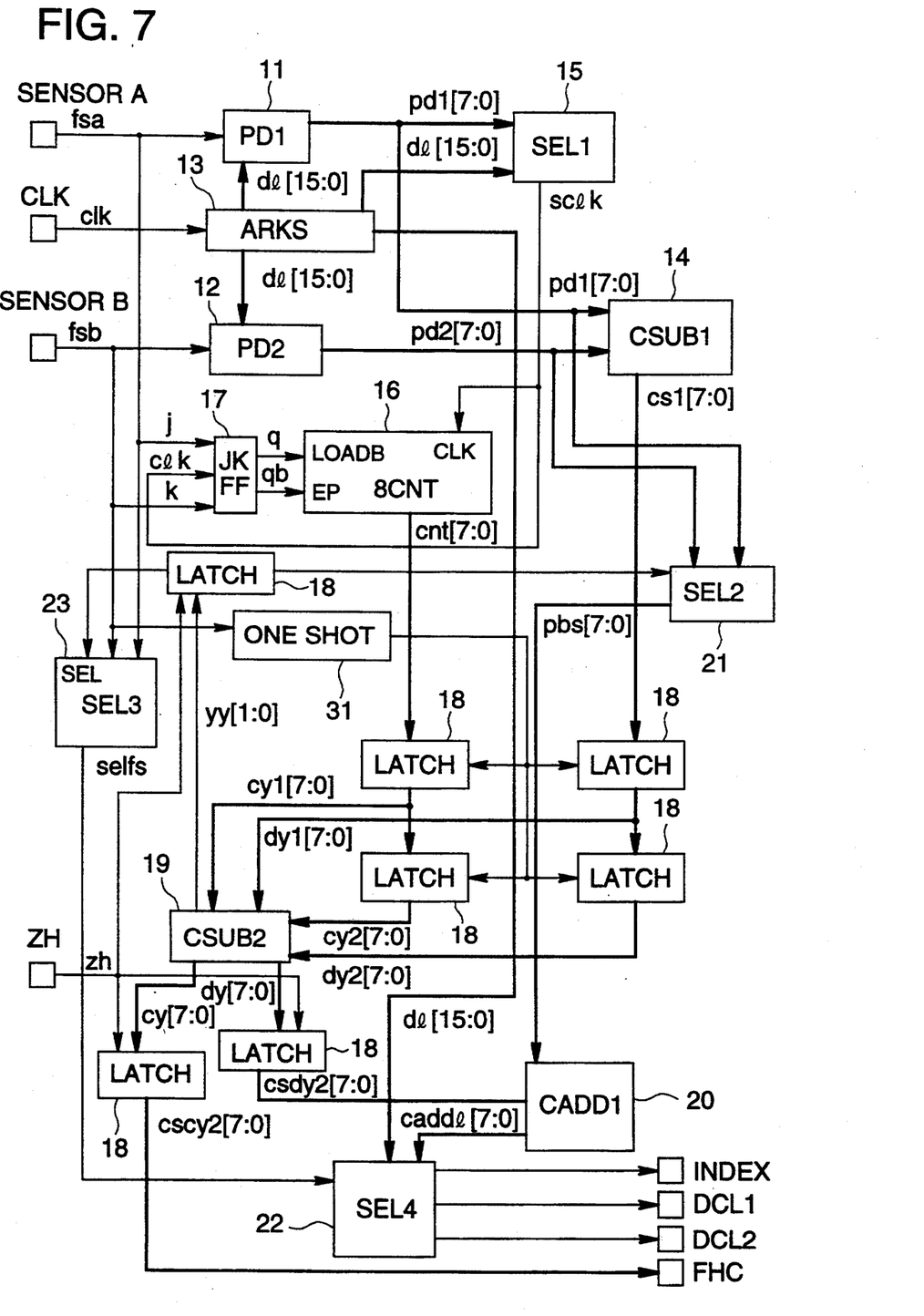
FIG. 7 is a block diagram showing the circuit structure for detecting and correcting deviation.

In FIG. 7, the outputs fsa, fsb of the sensors A, B are respectively outputted to the phase detector (1) 11 and the phase detector (2) 12. On the other hand, the reference clock CLK is inputted into the digital delay line 13. The digital delay line 13 outputs the delay clocks dl0 to dl15.

The phase detectors (1), (2) 11, 12 respectively detect the delay clocks dl0 to dl15 synchronizing with the rise of the detection signals of the sensors A, B (shown in FIG. 5 or FIG. 6). Results pd1, pd2 of the detection are outputted to the phase difference calculating section 14. In the phase difference calculating section 14, a phase difference (unit:1/16 period) between the delay clock synchronizing with the sensor A and the delay clock synchronizing with the sensor B is found, that is, the fractions of detection intervals of the sensors A, B in the clock period are found, and the results are latched in the latch circuit 18 in accordance with the one shot pulse generated in the one shot circuit 31.

The detection result pd1 of the phase detector (1) 11 is also outputted to the selector (1) 15, and the selector (1) 15 selectively outputs the delay clock sclk synchronizing with the detection signal of the sensor A.

The clock sclk is given to the counter 16. In the counter 16, the rising edge time of the output fsa, fsb of the sensors A, B is measured when the clock sclk is counted. In this connection, a section to be counted by the counter 16 is controlled by the flip-flop 17 into which the outputs fsa, fsb of the sensors A, B are inputted.

The count value cnt outputted from the counter 16 is latched to the latch circuit 18 by the action of the one shot pulse generated from the detection signal of the sensor B.

As described above, the detection intervals of the sensors A, B are found and latched as the count value and phase difference of the clock. First, the same laser beam is incident upon the sensors A and B, and the detection interval TΦ of the sensors A, B is measured, and then different laser beams are incident upon the sensors A and B, and the detection interval T2 of the sensors A, B is measured. The results of measurement are latched.

In the deviation time calculating section 19 (deviation time calculation means), the count value and phase difference are compared as described above. The deviation time T1 of the laser beams L1, L2 in the primary scanning direction is calculated by the clock count value and the clock phase difference, and the result of the calculation is latched.

In the deviation time calculating section 19, when the scanning order of the two laser beams L1, L2 is discriminated from the result of calculation of the deviation time, it is determined whether the detection signal of the sensor A is made to be the index signal "index", or the detection signal of the sensor B is made to be the index signal "index". The result of determination is latched.

In this connection, the data of the deviation time T1 and the result of selection of the index signal "index" are latched in accordance with the trigger signal ZH generated when the time TΦ is measured while only one of the laser beams is turned on in the case where the power source is turned on or immediately before the image formation is started.

The deviation found as the count value of the clock, is outputted to a counter (not shown) generating the HV signal (horizontal and vertical synchronization signal) for controlling the time to start image formation. The deviation shown by the count value of the clock is corrected by the control of an effective image region in accordance with the count of the printing clock in which the common index signal "index" is used as reference.

On the other hand, the deviation expressed by the phase difference of the printing clock is outputted into the phase difference calculation means 20. On the other hand, from the selector (2) 21 into which the detection results pd1, pd2 of the phase detectors (1), (2) 11, 12 are inputted, one of the detection results pd1, pd2 is outputted into the phase difference calculating section 20 in accordance with the result of selection of the index signal "index" described before.

In the phase difference calculating section 20, a delay clock having the phase difference corresponding to the deviation is calculated with respect to the delay clock inputted from the selector (2) 21, then the result of the calculation is outputted into the selector (4) 22.

Into the selector (4) 22, the phase difference information according to the deviation correction is inputted, and also the delay clocks dl0 to dl15 is inputted from the digital delay line 13. Further, a detection signal of selected sensor A or B is inputted into the selector (4) 22 from the selector (3) 23. From the selector (4) 22, the printing clocks DCLK1, DCLK2 corresponding to the laser beams L1, L2 are outputted together with the index signal "index".

For example, the following case is considered:
The laser beam L1 takes the lead. Two laser beams L1, L2 are selectively incident upon the sensors A, B. In this case, the laser beam L1 is incident upon the sensor A, and the deviation of the beams L1, L2 of the primary scanning direction is an amount corresponding to 2 counts of the printing clock, and also the deviation is an amount corresponding to 2 steps (2/16 period) of the phase difference.

In this case, a detection signal of the sensor A is outputted as the index signal "index". On the other hand, a delay clock synchronizing with the index signal "index" is outputted as the printing clock DCLK1 corresponding to the laser beam L1. A delay clock having the phase difference of 2/16 period with respect to the printing clock DCLK1 is outputted as the printing clock DCLK2 for the laser beam L2.

When the printing clocks DCLK1, DCLK2, the phases of which are different, are outputted corresponding to the laser beams L1, L2, the deviation of the printing clock in one period can be corrected as the phase difference of the printing clock.

Figure 3:
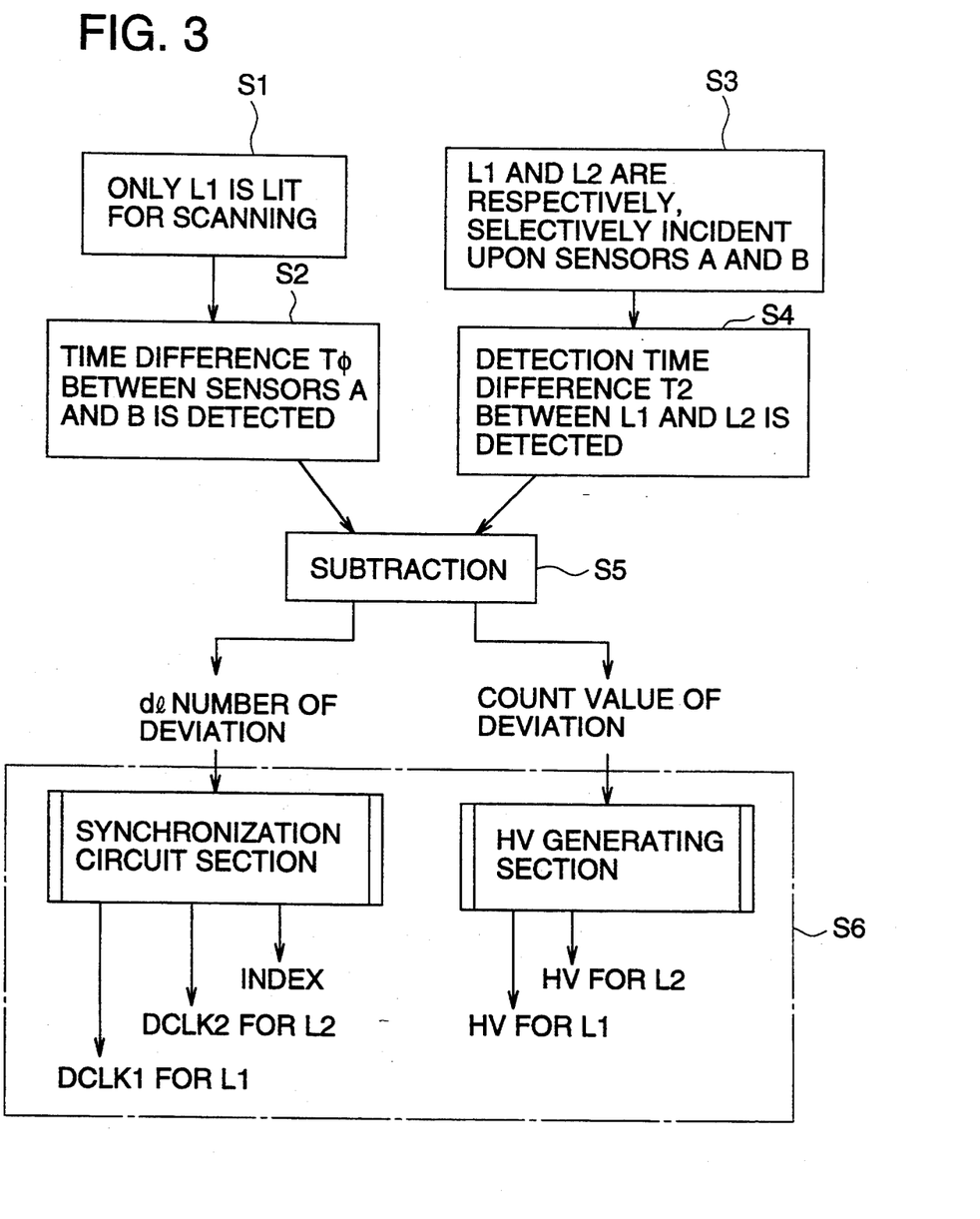
FIG. 3 is a flow chart showing the circumstances of detection and correction of deviation.

In this connection, the synchronizing circuit shown in FIG. 3 includes the phase detectors (1), (2) 11, 12, digital delay line 13, phase difference calculating section 20, selector (2) 21, selector (4) 22, and selector (3) 23.

The deviation of an integral multiple of the printing clock period is reflected on the control (HV generating section) by which the writing positions (the time of the start of image formation) of the laser beams L1, L2 are respectively set in accordance with the count of the printing clock.

When the correction for compensating the deviation of the laser beams L1, L2 of the primary scanning direction is conducted separately with respect to the printing clock phase and also with respect to the image formation start timing, the loads given to the circuit are reduced as compared with a case in which the deviation is corrected with respect to the image formation start time.

The correction in which the image formation start time of the laser beams L1, L2 is deviated by integral multiples of the clock period can be realized by the construction in which the count number of the printing clock is made to differ with reference to the common index signal "index". Other than that, the following construction may be employed:

With respect to the index signal "index" for the beam L1, an index signal "index" for the beam L2 is generated in which the phase is delayed by the clock period corresponding to the detected deviation. With reference to the index signal "index" of each beam, the image formation start time is controlled in accordance with the same count number.

When it has been discriminated from the result of calculation of the deviation time that the laser beam L2 takes the lead in the primary scanning direction, the following correction may be conducted:

A detection signal of the sensor B is used as the index signal "index". The image formation start time of the beam L1 which conducts scanning after the detection of the beam L2 by the sensor B, and the phase of the printing clock are delayed for correction in the same manner as the above example.

When it has been discriminated from the result of calculation of the deviation that the laser beam L2 takes the lead in the primary scanning direction, relations between the sensors A, B and the beams L1, L2 may be changed so that the laser beam L2 is incident upon the sensor A, and the laser beam L2 is incident upon the sensor B. In this way, the detection signal of the sensor A may be used as the index signal "index" at all times.

In the construction of the above example, two laser beams L1, L2 are used, however, it should be noted that the number of the beams is not limited to two.

For example, in the case where three laser beams L1, L2, L3 are used, the operation is conducted in the following manner:

Three light receiving sections A, B, C aligned in the scanning direction are provided as the index sensor 6. First, only one of the laser beams is turned on so as to conduct scanning, and the interval time $T\Phi1$ between A and B, and the interval time $T\Phi2$ between B and C are detected.

Next, the laser beam L1 is selectively incident upon the sensor A, the laser beam L2 is selectively incident upon the sensor B, and the laser beam L3 is selectively incident upon the sensor C. In this way, detection signals are provided by the sensors A, B, C. At this time, detection signal interval $T2-1$ between A and B, and detection signal interval $T2-2$ between B and C are measured.

As the deviation between $T2-1$ and $T\Phi1$, the delay time $T1L2$ of the laser beam L2 with respect to the laser beam L1 is calculated, and as the deviation between $T2-2$ and $T\Phi2$, the delay time $T1L3$ of the laser beam L3 with respect to the laser beam L2 is calculated.

In the aforementioned time measurement, in the same manner as that of the example described before, the measurement is conducted with respect to the count of the printing clock and the phase difference. The deviation expressed by the count number of the printing clock is reflected on the image formation start time controlled in accordance with the count of the printing clock. The deviation expressed by the phase difference of the printing clock is compensated by the phase difference of the printing clock corresponding to each beam.

As explained above, according to the present invention, in an image forming apparatus in which a plurality of light beams simultaneously conduct scanning in the primary scanning direction so that a plurality of lines are simultaneously recorded, the phase of the printing clock and the image formation start time for image formation conducted by each light beam are controlled in accordance with the deviation of the light beam of the primary scanning direction. Therefore, even if a positional relation between the plurality of light beams of the primary scanning direction is not constant, an accurate image formation can be simply and stably carried out.

What is claimed is:

1. A correction device of beam deviation in a primary scanning direction for use in an image forming apparatus in which a plurality of light beams are simultaneously scanned onto a recording media in the primary scanning direction so as to record a plurality of lines, said device comprising:

(a) a plurality of light beam detectors, the number of which corresponds to the number of said plurality of light beams, disposed in a scanning area in series in the primary scanning direction of said recording media, each for detecting each of said plurality of light beams;

(b) a first time difference detector for detecting a difference of detection time between said plurality of light beams when a single light beam out of said plurality of light beams is irradiated onto each of said plurality of light beam detectors;

(c) a beam detection controller for selectively irradiating a single light beam different from each other onto each of said plurality of light beam detectors;

(d) a second time difference detector for detecting a time difference between said plurality of light beam detectors by which different light beams are detected;

(e) a time deviation calculator for calculating deviation time of a plurality of light beams in the primary scanning direction in accordance with the time difference detected by said first time difference detector and the time difference detected by said second time difference detector; and (f) a deviation corrector for controlling phase of a printing clock to form images by each of plurality of light beams and a start timing of an image formation in accordance with the deviation time calculated by said time deviation calculator.

2. The correction device of claim 1, wherein the time in said first time difference detector, said second time difference detector and said time deviation calculator is acquired in the form of a count value of the printing clock and in the form of a phase difference of the printing clock in accordance with a plurality of printing clocks of different phases.

3. The correction device of claim 2, wherein said deviation corrector selectively outputs a printing clock corresponding to each light beam from said plurality of printing clocks in accordance with a phase difference of printing clock which is a deviation time calculated by said time deviation calculator, and controls start timing of an image formation by each light beam in accordance with a count value of the printing clock which is a deviation time calculated by said time deviation calculator.

4. The correction device of claim 1, wherein said beam detection controller judges a head light beam of the plurality of light beams which conducts a scanning operation in the primary scanning direction in accordance with the calculated result by said time deviation calculator, a relation between each of the plurality of light beam detectors is renewed so that the head light beam is irradiated onto a light beam detector located most upstream in the primary scanning direction, and a detection signal of the light beam detector located most upstream in the primary scanning direction is outputted as an index signal for controlling the image forming start timing.

5. The correction device of claim 1, wherein said beam detection controller judges a head light beam of the plurality of light beams which conducts a scanning operation in the primary scanning direction in accordance with the calculated result by said time deviation calculator, and outputs a detection signal of a light beam detector onto which the head light beam is irradiated, as an index signal for controlling the image forming start timing.

* * * * *